United States Patent
Yang et al.

(10) Patent No.: US 10,255,389 B2
(45) Date of Patent: Apr. 9, 2019

(54) METHOD FOR DESIGNING FREEFORM SURFACES OFF-AXIAL IMAGING SYSTEM WITH A REAL EXIT PUPIL

(71) Applicants: Tsinghua University, Beijing (CN); HON HAI PRECISION INDUSTRY CO., LTD., New Taipei (TW)

(72) Inventors: Tong Yang, Beijing (CN); Jun Zhu, Beijing (CN); Guo-Fan Jin, Beijing (CN); Shou-Shan Fan, Beijing (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 485 days.

(21) Appl. No.: 15/011,641

(22) Filed: Jan. 31, 2016

(65) Prior Publication Data

US 2016/0232258 A1    Aug. 11, 2016

(30) Foreign Application Priority Data

Feb. 5, 2015   (CN) .......................... 2015 1 0061862

(51) Int. Cl.
  *G06F 17/50*   (2006.01)
  *G02B 17/06*   (2006.01)
  *G02B 27/00*   (2006.01)

(52) U.S. Cl.
  CPC ..... *G06F 17/5009* (2013.01); *G02B 17/0642* (2013.01); *G02B 17/0663* (2013.01); *G02B 27/0012* (2013.01)

(58) Field of Classification Search
  CPC ............ G02B 17/0642; G02B 17/0663; G02B 27/0012; G06F 17/5009
  See application file for complete search history.

(56) References Cited

U.S. PATENT DOCUMENTS

| | | | | |
|---|---|---|---|---|
| 8,035,898 B2* | 10/2011 | Minano | ............. | G02B 27/0012 359/642 |
| 2005/0086032 A1* | 4/2005 | Benitez | ............. | G02B 27/0012 703/1 |

* cited by examiner

*Primary Examiner* — Kamini S Shah
*Assistant Examiner* — John E Johansen
(74) *Attorney, Agent, or Firm* — ScienBiziP, P.C.

(57) ABSTRACT

A method for designing freeform surface off-axial three-mirror imaging system with a real exit pupil is related. An initial system is established. A surface located before the real exit pupil is defined as surface M. A number of feature rays are selected. A number of ideal intersections of the feature rays with surface M are calculated. A number of intersections of the feature rays with each surface before surface M are calculated, and each surface before surface M is obtained by surface fitting. A number of intersections of the feature rays with surface M are calculated, and surface M is obtained by surface fitting. Surface M substitute for an initial surface, and repeating steps above, until the intersections of the feature rays with surface M are close to the ideal intersections, and the intersections of the feature rays with an image surface are close to the ideal image points.

12 Claims, 5 Drawing Sheets

METHOD FOR DESIGNING FREEFORM SURFACES OFF-AXIAL IMAGING SYSTEM WITH A REAL EXIT PUPIL

CROSS-REFERENCE TO RELATED APPLICATIONS

This application claims all benefits accruing under 35 U.S.C. § 119 from China Patent Application No. 201510061862.X, field on Feb. 5, 2015 in the China Intellectual Property Office, disclosure of which is incorporated herein by reference.

BACKGROUND

1. Technical Field

The present disclosure relates to a method for designing freeform surface off-axial imaging system with a real exit pupil based on point-by-point construction and iteration process.

2. Description of Related Art

In infrared imaging system, in order to increase the signal-to-noise ratio and the sensitivity of the system, the cooled detector and cold stop are used, especially the cold stop is located near the exit pupil. Thus, the infrared imaging system often has a real exit pupil at the position in front of the image surface. Furthermore, the infrared imaging system often uses an off-axial imaging system to reduce the transmission loss and eliminate the central obscuration. Thus, it is hard to design.

In recent years, with the development of the advancing manufacture technologies, freeform surfaces have been successfully used in the optical field, such as head-mounted-displays, reflective systems, varifocal panoramic optical systems, and micro-lens arrays. The freeform surface is used in the infrared imaging system. However, in conventional direct design methods, the freeform surfaces are designed by a direct construction method, it is hard to form a real exit pupil with small distortion, and further optimization will be much more difficult.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
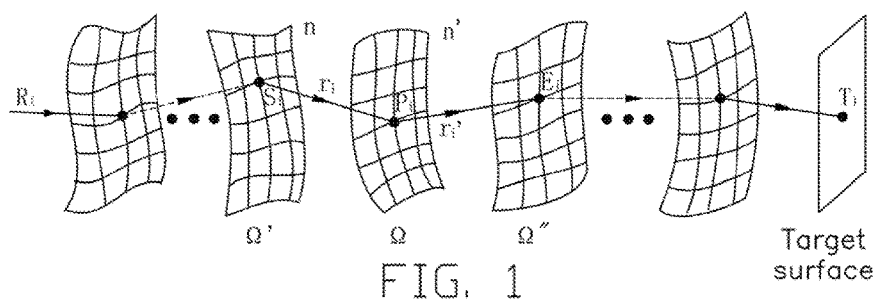
FIG. 1 is a schematic view of start point and end point of one feature ray while solving the feature data points.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like. It should be noted that references to "one" embodiment in this disclosure are not necessarily to the same embodiment, and such references mean at least one.

A method for designing a freeform surface off-axial imaging system with a real exit pupil of one embodiment is provided. The freeform surface off-axial imaging system comprises a plurality of freeform surfaces. The method comprises the following steps:

step (S1), establishing an initial system, wherein the initial system comprises a plurality of initial surfaces;

step (S2), a surface in front of and adjacent to the real exit pupil is defined as a surface M, selecting a plurality of feature rays $R_i$ (i=1, 2 ... K), calculating a plurality of ideal intersections of the plurality of feature rays $R_i$ (i=1, 2 ... K) with the surface M;

step (S3), calculating a plurality of intersections of the plurality of feature rays $R_i$ (i=1, 2 ... K) with one freeform surface of the freeform surface off-axial imaging system in front of the surface M point by point based on a given light mapping relationship and a vector form of Snell's law, wherein the plurality of intersections are a plurality of feature data points $P_i$ (i=1, 2 ... K) of the one freeform surface in front of the surface M; obtaining a before-iteration freeform surface by surface fitting the plurality of feature data points $P_i$ (i=1, 2 ... K); obtaining the other before-iteration freeform surfaces by repeating the same method above; and taking all the before-iteration freeform surfaces as the initial surfaces for an iteration process, and obtaining all after-iteration freeform surfaces in front of the surface M by multiple iterations;

step (S4), calculating a plurality of intersections of the plurality of feature rays $R_i$ (i=1, 2 ... K) with the surface M point by point based on a given object-image relationship and a vector form of Snell's law, wherein the plurality of intersections are a plurality of feature data points $P_i$ (i=1, 2 ... K) of the surface M; obtaining a before-iteration surface M by surface fitting the plurality of feature data points $P_i$ (i=1, 2 ... K); and taking the before-iteration surface M as the initial surface for an iteration process, and obtaining an after-iteration surface M by multiple iterations; and step (S5), taking the after-iteration surface M obtained in step (S4) as the initial surface, keeping some of the plurality of initial surfaces of step (S1) that does not corresponds to the after-iteration surface M unchanged; and repeating steps (S2)-(S4) until match the two conditions: condition (1), after being redirected by all the after-iteration freeform surfaces in front of the surface M of step (S3), a plurality of actual intersections of the plurality of feature rays $R_i$ (i=1, 2 ... K) with the after-iteration surface M of step (S4) are substantially close to the plurality of ideal intersections of step (2); and condition (2): after being redirected by all the after-iteration freeform surfaces in front of the surface M of step (S3) and the after-iteration surface M of step (S4), a plurality of actual intersections of the plurality of feature rays $R_i$ (i=1, 2 ... K) with the imaging surface are substantially close to a plurality of ideal image points.

In step (S1), the initial surface can be a planar surface or a spherical surface. The locations of the plurality of initial surfaces can be selected according to the actual needs of the freeform surface off-axial imaging system with a real exit pupil. In one embodiment, the initial surface is a planar surface. Each initial surface is located at a position that substantially corresponds to one of the freeform surfaces of the freeform surface off-axial imaging system. The initial surface can redirect the lights in substantially the same manner as the freeform surfaces of the freeform surface off-axial imaging system. Furthermore, in a off-axial imaging reflection system, the initial surface can eliminate the obscuration.

In step (S2), a method of selecting the plurality of feature rays $R_i$ (i=1, 2 ... K) comprises: M fields are selected according to the imaging systems actual needs, an aperture of each of the M fields is divided into N equal parts, and P feature rays at different aperture positions in each of the N equal parts are selected. As such, K=M×N×P different feature rays corresponding to different aperture positions and different fields are fixed. The aperture can be a circle, a rectangle, a square, an oval or other shapes.

In one embodiment, the aperture of each of the M fields is a circle, and a circular aperture of each of the M fields is divided into N angles with equal interval φ, as such, N=2π/φ, and then, P different aperture positions are fixed along a radial direction of each of the N angles. Therefore, K=M×N×P different feature rays corresponding to different aperture positions and different fields are fixed.

For the of the freeform surface off-axial imaging system with a real exit pupil, when the field of view, the focal-length, F-number, the size of the real exit pupil, the distance between the real exit pupil and the imaging surface, and the distance between the real exit pupil and the surface M are substantially given, the plurality of ideal intersections of the plurality of feature rays $R_i$ (i=1, 2 ... K) with the surface M are certain. The plurality of ideal intersections of the plurality of feature rays $R_i$ (i=1, 2 ... K) with the surface M can be obtained using a reverse ray trace from the imaging surface to the surface M. In one embodiment, the plurality of feature rays $R_i$ (i=1, 2 ... K) are radiated from the ideal image points of the sample fields, the plurality of intersections of the plurality of feature rays $R_i$ (i=1, 2 ... K) with the surface M are used as the plurality of ideal intersections of the plurality of feature rays $R_i$ (i=1, 2 ... K) with the surface M.

In step (S3), referring to FIG. 1, a surface Ω is defined as the one freeform surface in front of the surface M, a surface Ω' is defined as a surface located adjacent to and before the surface Ω, and a surface Ω'' is defined as a surface located adjacent to and after the surface Ω. The intersections of the plurality of feature rays $R_i$ (i=1, 2 ... K) with the surface Ω are defined as the feature data points $P_1$ (i=1, 2 ... K). The feature data points $P_1$ (i=1, 2 ... K) can be obtained by the intersections of the feature rays $R_i$ (i=1, 2 ... K) with the surface Ω' and the surface Ω''. The plurality of feature rays $R_i$ (i=1, 2 ... K) are intersected with the surface Ω' at a plurality of start points $S_i$ (i=1, 2 ... K), and intersected with the surface Ω'' at a plurality of end points $E_i$ (i=1, 2 ... K). When the surface Ω the plurality of feature rays $R_i$ (i=1, 2 ... K) are determined, the plurality of start points $S_i$ (i=1, 2 ... K) of the feature rays $R_i$ (i=1, 2 ... K) can also be determined. The plurality of end points $E_i$ (i=1, 2 ... K) can also be obtained based on the object-image relationship or given mapping relationship. Under ideal conditions, the feature rays $R_i$ (i=1, 2 ... K) emitted from the plurality of start points $S_i$ (i=1, 2 ... K) on the surface Ω'; pass through the feature data points $P_i$ (i=1, 2 ... K) on the surface Ω; intersect with the surface Ω'' at the plurality of end points $E_i$ (i=1, 2 ... K); and finally intersect with the image plane at the plurality of ideal target points $T_{i,ideal}$ (i=1, 2 ... K). If the surface Ω'' is the surface M, the plurality of end points $E_i$ (i=1, 2 ... K) are the plurality of ideal target points $T_{i,ideal}$ (i=2 ... K). If there are other surfaces between the surface Ω and the surface M, the plurality of end points $E_i$ (i=1, 2 ... K) are the points on the surface Ω'', which make the first variation of the optical path length between the feature data points $P_i$ (i=1, 2 ... K) and their corresponding target points zero. $\delta S = \delta \int_{P_i}^{T_{i,ideal}} n ds = 0$, wherein ds is the differential elements of the optical path length along the plurality of feature rays $R_i$ (i=1, 2 ... K), n denotes the refractive index of the medium, and δ denotes a differential variation.

The plurality of feature data points $P_i$ (i=1, 2 ... K) can be obtained by the following two calculating methods.

A first calculating method comprises the following sub-steps:

step (a): defining a first intersection of a first feature ray $R_1$ and the initial surface corresponding to the one freeform surface as a feature data point $P_1$;

step (b): when i (1≤i≤K−1) feature data points $P_i$ (1≤i≤K−1) have been obtained, a unit normal vector $\vec{N}_i$ (1≤i≤K−1) at each of the i (1≤i≤K−1) feature data points $P_i$ (1≤i≤K−1) can be calculated based on a vector form of Snell's Law;

step (c): making a first tangent plane at the i (1≤i≤K−1) feature data points Pi (1≤i≤K−1) respectively; thus i first tangent planes can be obtained, and i×(K−i) second intersections can be obtained by the i first tangent planes intersecting with remaining (K−i) feature rays; and a second intersection, which is nearest to the i (1≤i≤K−1) feature data points $P_i$, is fixed from the i×(K−i) second intersections as a next feature data point Pi+1 (1≤i≤K−1); and step (d): repeating steps (b) and (c), until all the plurality of feature data points $P_i$ (i=1, 2 . . . K) are calculated.

In step (b), the unit normal vector $\vec{N}_i$ (1≤i≤K−1) at each of the feature data point Pi (1≤i≤K−1) can be calculated based on the vector form of Snell's Law. When the first freeform surface is a refractive surface, $$\vec{N}_i = \frac{n'\vec{r}_i' - n\vec{r}_i}{|n'\vec{r}_i' - n\vec{r}_i|} \quad (1)$$

$$\vec{r}_i = \frac{\overrightarrow{P_iS_i}}{|\overrightarrow{P_iS_i}|}$$

is a unit vector along a direction of an incident ray for the first freeform surface;

$$\vec{r}_i' = \frac{\overrightarrow{E_iP_i}}{|\overrightarrow{E_iP_i}|}$$

is a unit vector along a direction for an exit ray of the first freeform surface; and n, n' is refractive index of a media before and after the first freeform surface respectively.

Similarly, when the first freeform surface is a reflective surface, $$\vec{N}_i = \frac{\vec{r}_i' - \vec{r}_i}{|\vec{r}_i' - \vec{r}_i|}. \quad (2)$$

The unit normal vector $\vec{N}_i$ at each of the plurality of feature data points $P_i$ (i=1, 2 . . . K) is perpendicular to the first tangent plane at each of the plurality of feature data points $P_i$ (i=1, 2 . . . K). Thus, the first tangent plane at each of the plurality of feature data points Pi (i=1, 2 . . . K) can be obtained.

The first calculating method comprises a computational complexity formula of $$T(K) = \sum_{i=1}^{K-1} i(K-i) = \frac{1}{6}K^3 - \frac{1}{6}K = O(K^3).$$

When a large quantity of feature rays are used in a design, the first calculating method requires a long computation time.

A second calculating method comprises the following sub-steps:

step (a'): defining a first intersection of a first feature light ray $R_1$ and the initial surface corresponding to the one freeform surface as a feature data point $P_1$;

step (b'): when an ith (1≤i≤K−1) feature data point Pi (1≤i≤K−1) has been obtained, a unit normal vector $\vec{N}_i$ at the ith (1≤i≤K−1) feature data point $P_I$ (1≤i≤K−1) can be calculated based on the vector form of Snell's law;

step (c'): making a first tangent plane through the ith (1≤i≤K−1) feature data point Pi (1≤i≤K−1), and (K−i) second intersections can be obtained by the first tangent plane intersecting with remaining (K−i) feature rays; a second intersection $Q_{i+1}$, which is nearest to the ith (1≤i≤K−1) feature data point $P_i$ (1≤i≤K−1), is fixed; and a feature ray corresponding to the second intersection $Q_i$1 is defined as Ri+1, a shortest distance between the second intersection $Q_{i+1}$ and the ith feature data point $P_i$ (1≤i≤K−1) is defined as di;

step (d'): making a second tangent plane at (i−1) feature data points that are obtained before the ith feature data point $P_1$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the (i−1) third intersections and its corresponding feature data point form an intersection pair; the intersection pair, which has the shortest distance between a third intersection and its corresponding feature data point, is fixed; and the third intersection and the shortest distance is defined as Q'$_{i+1}$1 and d'$_i$ respectively;

step (e'): comparing $d_i$ and d'$_i$, if $d_i$≤d'$_i$, $Q_{+1}$ is taken as the next feature data point $P_{i+1}$ (1≤i≤K−1); otherwise, is taken as the next feature data point $P_{1+1}$ (1≤i≤K−1); and step (f'): repeating steps from (b') to (e'), until the plurality of feature data points $P_i$ (i=1, 2 . . . K) are all calculated.

In step (b'), a calculating method of the unit normal vector $\vec{N}_i$ at the ith (1≤i≤K−1) feature data point $P_i$ (1≤i≤K−1) is the same as the first calculating method.

A second calculating method comprises a computational complexity formula of $$T(K) = \sum_{i=1}^{K-1} K - i + i - 1 = (K-1)^2 = O(K^2).$$

When a large quantity of feature rays are used in a design, the computational complexity of the second calculating method is much smaller than the computational complexity of the first calculating method.

In step (S3), the equation of each freeform surface in front of the surface M can be expressed as follows:

$$z(x, y) = \frac{c(x^2 + y^2)}{1 + \sqrt{1 - (1 + k)c^2(x^2 + y^2)}} + \sum_{j=1}^{N} A_j g_j(x, y),$$

wherein, $$\frac{c(x^2 + y^2)}{1 + \sqrt{1 - (1 + k)c^2(x^2 + y^2)}}$$

is the conic term, c is the curvature of the conic surface at the vertex, k is the conic constant;

$$\sum_{j=1}^{N} A_j g_j(x, y)$$

is the freeform surface term, $A_i$ represents the ith term coefficient. The freeform surface term can be XY polynomials, Zernike polynomials, Chebyshev polynomials, or the like.

In one embodiment, the space of the initial system is defined as a first three-dimensional rectangular coordinates system. The propagation direction of beams is defined as a Z-axis, and the Z-axis is perpendicular to an XOY plane.

A method of surface fitting the plurality of feature data points $P_i$ (i=1, 2 . . . K) comprises:

step (31): surface fitting the plurality of feature data points $P_i$ (i=1, 2 . . . K) to a sphere in the first three-dimensional rectangular coordinates system, and obtaining a curvature c of the sphere and the center of curvature $(x_c, y_c, z_c)$ corresponding to the curvature c of the sphere;

step (S32): defining the feature data point $(x_o, y_o, z_o)$ corresponding to a chief ray of the central field angle among the entire field-of-view (FOV) as the vertex of the sphere, defining a second three-dimensional rectangular coordinates system by the vertex of the sphere as origin and a line passing through the center of curvature and the vertex of the sphere as a Z'-axis;

step (S33): transforming the coordinates $(x_i, y_i, z_i)$ and the normal vector $(\alpha_i, \beta_i, \gamma_i)$, of the plurality of feature data points $P_i$ (i=1, 2 . . . K) in the first three-dimensional rectangular coordinates system, into the coordinates $(x'_i, y'_i, z'_i)$ and the normal vector $(\alpha'_i, \beta'_i, \gamma'_i)$, of the plurality of feature data points $P_i$ (i=1, 2 . . . K) in the second three-dimensional rectangular coordinates system;

step (S34): fitting the plurality of feature data points $P_i$ (i=1, 2 . . . K) into a conic surface equation of a conic surface in the second three-dimensional rectangular coordinates system, based on the coordinates $(x'_i, y'_i, z'_i)$ and the curvature c of the sphere, and obtaining the conic constant k; and step (S35): removing the coordinates and the normal vector of the plurality of feature data points $P_i$ (i=1, 2 . . . K), on the conic surface in the second three-dimensional rectangular coordinates system, from the coordinates $(x'_i, y'_i, z'_i)$ and the normal vector $(\alpha'_i, \beta'_i, \gamma'_i)$, to obtain a residual coordinate and a residual normal vector; and fitting the residual coordinate and the residual normal vector to obtain a polynomial surface equation; the equation of the first freeform surface can be obtained by adding the conic surface equation and the polynomial surface equation.

Generally, the imaging systems are symmetric about the YOZ plane. Therefore, the tilt angle $\theta$ of the sphere, in the Y'O'Z' plane of the second three-dimensional rectangular coordinates system relative to in the YOZ plane of the first three-dimensional rectangular coordinates system, is:

$$\theta = \arctan\left(\frac{y_o - y_c}{z_o - z_c}\right).$$

The relationship between the coordinates $(x'_i, y'_i, z'_i)$ and the coordinates $(x_i, y_i, z_i)$ of each of the plurality of feature data points $P_i$ (i=1, 2 . . . K) can be expressed as following:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases}.$$

The relationship between the normal vector $(\alpha'_i, \beta'_i, \gamma'_i)$ and the normal vector $(\alpha_i, \beta_i, \gamma_i)$ of each of the plurality of feature data points $P_i$ (i=1, 2 . . . K) can be expressed as following:

$$\begin{cases} \alpha'_i = \alpha_i \\ \beta'_i = \beta_i \cos\theta - \gamma_i \sin\theta \\ \gamma'_i = \beta_i \sin\theta + \gamma_i \cos\theta \end{cases}.$$

In the second three-dimensional rectangular coordinates system, the coordinates and the normal vector of the plurality of feature data points $P_i$ (i=1, 2 . . . K) on the conic surface are defined as $(x'_i, y'_i, z'_{is})$ and $(\alpha'_{is}, \beta'_{is}, \gamma'_{is})$ respectively. The Z'-axis component of the normal vector is normalized to $-1$. The residual coordinate $(x''_i, y''_i, z''_i)$ and the residual normal vector $(\alpha''_i, \beta''_i, \gamma''_i)$ can be obtained, wherein, $$(x''_i, y''_i, z''_i) = (x'_i, y'_i, z'_i - z'_{is}) \text{ and}$$

$$(\alpha''_i, \beta''_i, -1) = \left(-\frac{\alpha'_i}{\gamma'_i} + \frac{\alpha'_{is}}{\gamma'_{is}}, \frac{\beta'_i}{\gamma'_i} + \frac{\beta'_{is}}{\gamma'_{is}}, -1\right).$$

In step S(35), a method of surface fitting the residual coordinate and the residual normal vector comprises:

step (S351): in the second three-dimensional rectangular coordinates system, expressing the a polynomial surface by the polynomial surface equation leaving out the conic surface term, the polynomial surface can be expressed in terms of the following equation:

$$z = f(x, y; P) = \sum_{j=1}^{J} P_j g_j(x, y),$$

wherein $g_j(x, y)$ is one item of the polynomial, and $P=(p_1, p_2, L, p_J)^T$ is the coefficient sets;

step (S352): acquiring a first sum of squares d1(P), of residual coordinate differences in z' direction between the residual coordinate value $(x''_i, y''_i, z''_i)$ (i=1, 2, . . . , K) and the freeform surface; and a second sum of squares d2(P), of modulus of vector differences between the residual normal vector $N_i = (\alpha''_i, \beta''_i, -1)$ (i=1, 2, . . . , K) and a normal vector of the freeform surface, wherein the first sum of squares d1(P) is expressed in terms of a first equation:

$$d_1(P) = \sum_{i=1}^{I} [z_i - f(x''_i, y''_i; P)]^2 = (Z - A_1 P)^T (Z - A_1 P),$$

and the second sum of squares d2(P) is expressed in terms of a second equation:

$$d_2(P) = \sum_{i=1}^{I} \{[u_i - f_{x''}(x''_i, y''_i; P)]^2 + [v_i - f_{y''}(x''_i, y''_i; P)]^2\} =$$

$$(U - A_2 P)^T (U - A_2 P) + (V - A_3 P)^T (V - A_3 P) \text{ wherein,}$$

$$Z = (z_1, z_2, L, z_I)^T,$$

-continued $$U = (u_1, u_2, L, u_I)^T,$$

$$V = (v_1, v_2, L, v_I)^T,$$

$$A_1 = \begin{pmatrix} g_1(x_1'', y_1'') & g_2(x_1'', y_1'') & \cdots & g_J(x_1'', y_1'') \\ g_1(x_2'', y_2'') & g_2(x_2'', y_2'') & \cdots & g_J(x_2'', y_2'') \\ \vdots & \vdots & & \vdots \\ g_1(x_I'', y_I'') & g_2(x_I'', y_I'') & \cdots & g_J(x_I'', y_I'') \end{pmatrix},$$

$$A_2 = \begin{pmatrix} g_1^x(x_1'', y_1'') & g_2^x(x_1'', y_1'') & \cdots & g_J^x(x_1'', y_1'') \\ g_1^x(x_2'', y_2'') & g_2^x(x_2'', y_2'') & \cdots & g_J^x(x_2'', y_2'') \\ \vdots & \vdots & & \vdots \\ g_1^x(x_I'', y_I'') & g_2^x(x_I'', y_I'') & \cdots & g_J^x(x_I'', y_I'') \end{pmatrix},$$

$$A_3 = \begin{pmatrix} g_1^y(x_1'', y_1'') & g_2^y(x_1'', y_1'') & \cdots & g_J^y(x_1'', y_1'') \\ g_1^y(x_2'', y_2'') & g_2^y(x_2'', y_2'') & \cdots & g_J^y(x_2'', y_2'') \\ \vdots & \vdots & & \vdots \\ g_1^y(x_I'', y_I'') & g_2^y(x_I'', y_I'') & \cdots & g_J^y(x_I'', y_I'') \end{pmatrix};$$

step (S353): obtaining an evaluation function, $$P = (A_1^T A_1 + w A_2^T A_2 + w A_3^T A_3)^{-1} \cdot (A_1^T Z + w A_2^T U + w A_3^T V),$$

wherein w is a weighting greater than 0;

step (S354): selecting different weightings w and setting a gradient $\nabla f(P)$ of the evaluation function equal to 0, to obtain a plurality of different values of P and a plurality of freeform surface shapes z=f (x, y; P) corresponding to each of the plurality of different values of P; and step (S355): choosing a final freeform surface shape $\Omega_{opt}$ which has a best imaging quality from the plurality of freeform surface shapes z=f(x, y; P).

Figure 2:
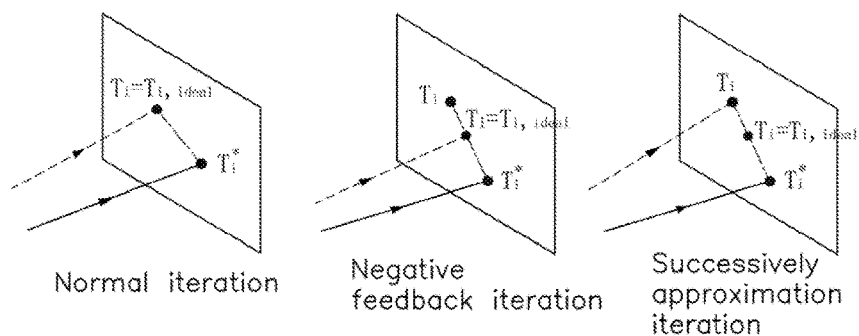
FIG. 2 shows a schematic view of one embodiment of types of the iterative process of off-axial imaging system with freeform surface.

FIG. 2 illustrates that the type of the iteration of step (S3) can be normal iteration, negative feedback iteration, or successively approximation iteration. The negative feedback iteration is faster. The successively approximation iteration is more stable.

In the normal iteration, the target point $T_i$ is the ideal target point $T_{i,ideal}$, $T_i = T_{i,ideal}$.

In negative feedback iteration, the negative feedback function can be written as:

$$T_i = \begin{cases} T_{i,ideal} + \varepsilon \Delta & \text{if } (T_{i,ideal} - T_i^*) > \Delta \\ T_{i,ideal} + \varepsilon(T_{i,ideal} - T_i^*) & \text{if } -\Delta \le (T_{i,ideal} - T_i^*) \le \Delta, \\ T_{i,ideal} - \varepsilon \Delta & \text{if } (T_{i,ideal} - T_i^*) < -\Delta \end{cases}$$

wherein $\varepsilon$ is the feedback coefficient, and $\varepsilon$ is larger than zero; $T_i^*$ is the actual intersections of the plurality of feature rays $R_i$ (i=1, 2 . . . K) with the target surface before the current iteration and after the previous iteration; $\Delta$ is a feedback threshold, and $\Delta$ is larger than zero, the feedback threshold is conducive to avoid instability of the iterative process caused by a dramatic change of $T_i$ due to large deviation between $T_i^*$ and $T_{i,ideal}$.

In the successively approximation iteration, $$T_i = T_i^* + \rho(T_{i,ideal} - T_i^*),$$

wherein $\rho$ is the approximation coefficient, and $\rho$ is larger than zero.

In step (S3), the obtaining all after-iteration freeform surfaces in front of the surface M by multiple iterations can be carried out by following sub-steps:

step (S31a): selecting N=1, a plurality of third actual intersections of the plurality of feature rays $R_i$ (i=1, 2 . . . K) with the before-iteration Nth freeform surface are solved according to the Nth equation of the before-iteration Nth freeform surface and defined as a plurality of actual feature data points P'$_i$ (i=1, 2, . . . , K), a unit normal vector at each of the a plurality of actual feature data points P'$_i$ (i=1, 2, . . . , K) is calculated, and the plurality of actual feature data points P'$_i$ (i=1, 2, . . . , K) are surface fitted with the method in step (S31), to obtain an after-iteration Nth freeform surface;

step (S31b): selecting N as N=N+1;

step (S31c): repeating step (S31a) to step (S31b) to obtain all after-iteration freeform surfaces, thereby the iteration process is performed once; and step (S31d): all the after-iteration freeform surfaces obtained in step (S31c) is used as a plurality of second initial surfaces, and repeating step (S31a) to step (S31c), until the plurality of second actual intersections of the plurality of feature rays $R_i$ (i=1, 2 . . . K) with the imaging surface are close to the ideal target points, and the iteration process is finished.

In step (S4), the plurality of feature data points $P_i$ (i=1, 2 . . . K) of the surface M can be solved and the surface M can be obtained by the same methods provided in the step (S3). The obtaining the after-iteration surface M by multiple iterations can be performed as the same iteration methods provided in the step (S3).

Furthermore, a step of optimizing the after-iteration freeform surface off-axial imaging system obtained in step (S5) by using the after-iteration freeform surface off-axial imaging system as a starting point of optimization can be performed.

Figure 3:
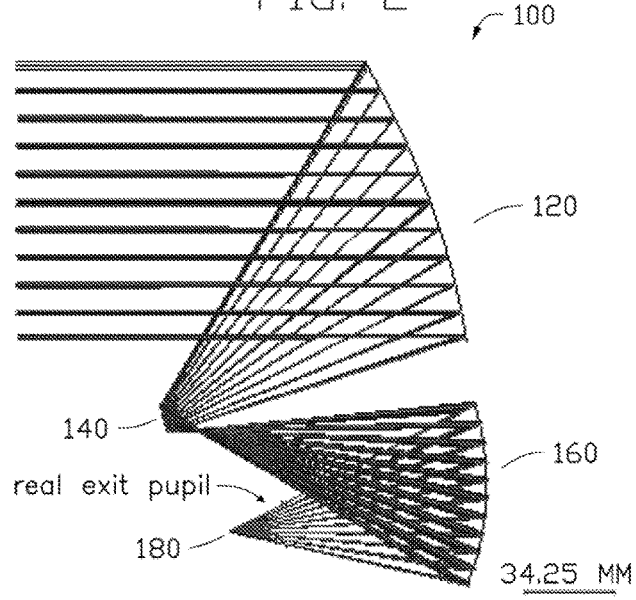
FIG. 3 shows a light path schematic view of one embodiment of a freeform surface off-axial three-mirror imaging system with a real exit pupil.

Referring to FIG. 3, an design example of a freeform surface off-axial three-mirror imaging system 100 with a real exit pupil of one embodiment is provided. The freeform surface off-axial three-mirror imaging system 100 comprises a primary mirror 120, a secondary mirror 140 and a tertiary mirror 160 located in that order and spaced from each other. The primary mirror 120, the secondary mirror 140 and the tertiary mirror 160 are freeform surfaces. The feature rays coming from the object space would be successively reflected by the primary mirror 120, the secondary mirror 140 and the tertiary mirror 160 to form an image on an imaging surface 180. The real exit pupil is formed before the imaging surface 180. The parameters of the freeform surface off-axial three-mirror imaging system 100 are shown in table 1 below.

TABLE 1 parameters of the freeform surface off-axial three-mirror optical system 100

| Parameters | Values |
| --- | --- |
| Field of View | 7° × 0.1° |
| F-Number | 1.5 |
| Wave Range | LWIR (8-12 μm) |
| Distance between the Exit Pupil and the Detector | 18-22 mm |
| Detector Pixel Size | 30 μm × 30 μm |
| Entrance Pupil Diameter | 100 mm |

The method for designing the freeform surface off-axial three-mirror imaging system 100 with a real exit pupil comprises the following steps:

step (S1'), establishing an initial planar surface system, wherein the initial planar surface system comprises a primary mirror initial planar surface, a secondary mirror initial planar surface and a tertiary mirror initial planar surface;

step (S2'), selecting a plurality of feature rays, and calculating a plurality of ideal intersections of the plurality of feature rays with the tertiary mirror initial planar surface;

step (S3'), keeping the secondary mirror initial planar surface and the tertiary mirror initial planar surface unchanged, calculating a plurality of intersections of the plurality of feature rays with a before-iteration primary mirror point by point based on a given light mapping relationship and a vector form of Snell's law, wherein the plurality of intersections are a plurality of first feature data points of the before-iteration primary mirror; and obtaining the before-iteration primary mirror by surface fitting the plurality of first feature data points;

step (S4'), keeping the before-iteration primary mirror and the tertiary mirror initial planar surface unchanged, selecting a plurality of feature rays, calculating a plurality of intersections of the plurality of feature rays with a before-iteration secondary mirror point by point based on a given light mapping relationship and a vector form of Snell's law, wherein the plurality of intersections are a plurality of second feature data points of the before-iteration secondary mirror; and obtaining the before-iteration secondary mirror by surface fitting the plurality of second feature data points; taking the before-iteration primary mirror and before-iteration secondary mirror as the initial surfaces for an iteration process, and obtaining an after-iteration primary mirror and an after-iteration secondary mirror by multiple iterations;

step (S5'), keeping the after-iteration primary mirror and the after-iteration secondary mirror unchanged, selecting a plurality of feature rays, calculating a plurality of intersections of the plurality of feature rays with a before-iteration tertiary mirror point by point based on a given object-image relationship and a vector form of Snell's law, wherein the plurality of intersections are a plurality of third feature data points of the before-iteration tertiary mirror; and obtaining the before-iteration tertiary mirror by surface fitting the plurality of third feature data points; taking the before-iteration tertiary mirror as the initial surfaces for an iteration process, and obtaining an after-iteration tertiary mirror by multiple iterations;

step (S6'), taking the after-iteration tertiary mirror obtained in step (S5') as the initial surface, keeping the primary mirror initial planar surface and the secondary mirror initial planar surface unchanged; and repeating steps (S2')-(S5'), thereby obtain an before-optimization freeform surface off-axial three-mirror imaging system; and step (S7'), optimizing the before-optimization freeform surface off-axial three-mirror imaging system obtained in step (S6') to obtain the freeform surface off-axial three-mirror imaging system 100.

Because the freeform surface off-axial three-mirror imaging system 100 is symmetry for the YOZ plane, only half fields should be considered. Furthermore, in the of the freeform surface off-axial three-mirror imaging system 100, the fields along X direction are much greater than the fields along Y direction, thus, five sample fields along Y direction are selected. The five off-axial fields are (0°, 0°) (0.875°, 0°) (1.75°, 0°) (2.625°, 0°), (3.5°, 0°). In step (S3')-step (S5'), the plurality of feature data points of are obtained by the second calculating method described above. The methods of fitting the plurality of feature data points are the same as the fitting method of step (S3). In step (S4')-step (S5'), the methods of iteration process are the same as the iteration process of step (S3).

Figure 4:
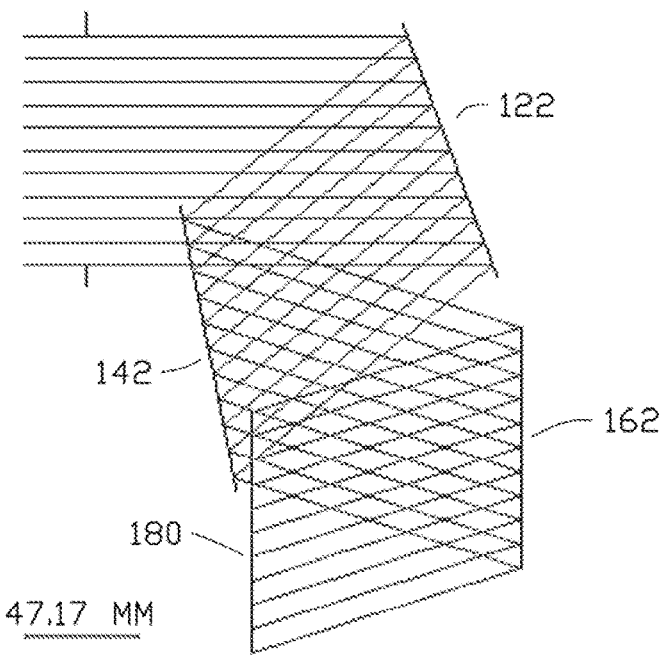
FIG. 4 shows a light path schematic view of one embodiment of an initial planar surface system.

Referring to FIG. 4, a light path schematic view of an initial planar surface system in step (S1') is shown. The initial planar surface system comprises the primary mirror initial planar surface 122, the secondary mirror initial planar surface 142 and the tertiary mirror initial planar surface 162. It is shown that the beams of each field does not form focus on the imaging surface 180 and also does not have a real exit pupil before the imaging surface 180.

Figure 5:
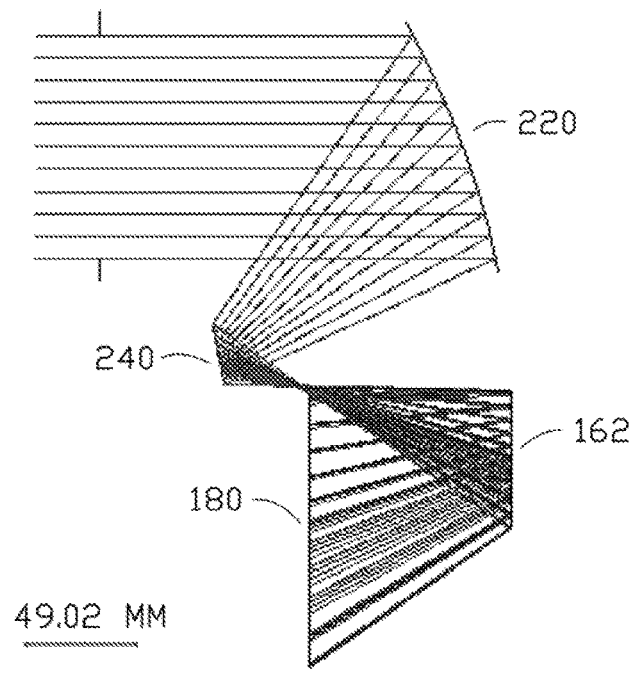
FIG. 5 shows a light path schematic view of one embodiment of a freeform surface off-axial three-mirror imaging system comprising an after-iteration primary mirror, an after-iteration secondary mirror and a third mirror initial planar surface.

Referring to FIG. 5, a light path schematic view of the freeform surface off-axial three-mirror imaging system of step (S4') is shown. The freeform surface off-axial three-mirror imaging system comprises the after-iteration primary mirror 220, the after-iteration secondary mirror 240 and the tertiary mirror initial planar surface 162. It is shown that the feature rays of different fields and pupil positions can intersect the tertiary mirror initial planar surface 162 at the ideal target points approximately.

Figure 6:
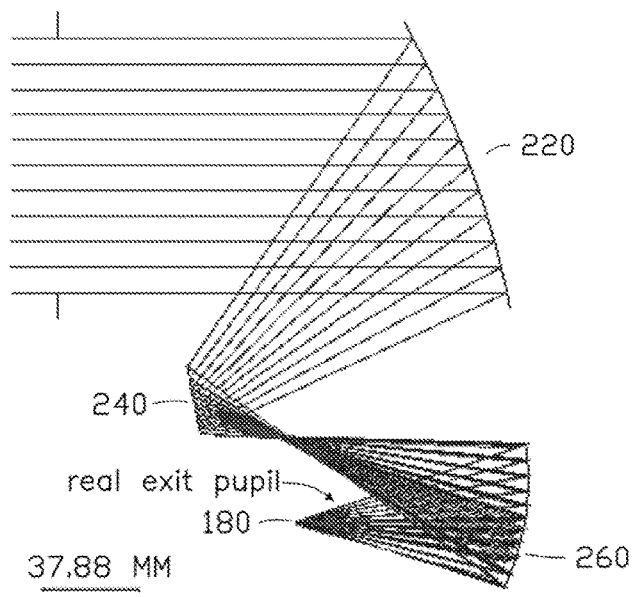
FIG. 6 shows a light path schematic view of one embodiment of a freeform surface off-axial three-mirror imaging system comprising an after-iteration primary mirror, an after-iteration secondary mirror and an after-iteration third mirror.
Figure 7:
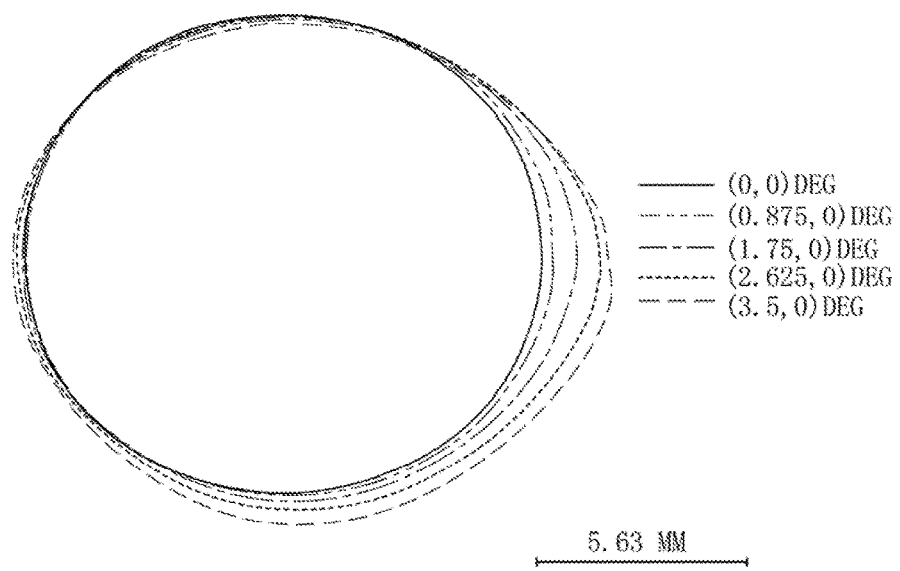
FIG. 7 shows light spots schematic view of different fields at exit pupil surface of one embodiment of the freeform surface off-axial three-mirror imaging system of FIG. 6.

Referring to FIG. 6, a light path schematic view of the freeform surface off-axial three-mirror imaging system of step (S5') is shown. The freeform surface off-axial three-mirror imaging system comprises the after-iteration primary mirror 220, the after-iteration secondary mirror 240 and the after-iteration tertiary mirror 260. It is shown that the beams of each field can approximately focus on the imaging surface 180 and have an approximately real exit pupil before the imaging surface 180. However, the light footprints at exit pupil surfaces of different fields is shown in FIG. 7. It is shown that there are a great distortion of size and shape between the real exit pupil and the ideal exit pupil. Because there is great difference of surface shapes between the after-iteration tertiary mirror 260 and the tertiary mirror initial planar surface 162, it is hard to make the feature rays of different fields and pupil positions intersect the after-iteration tertiary mirror 260 at ideal target points.

Figure 8:
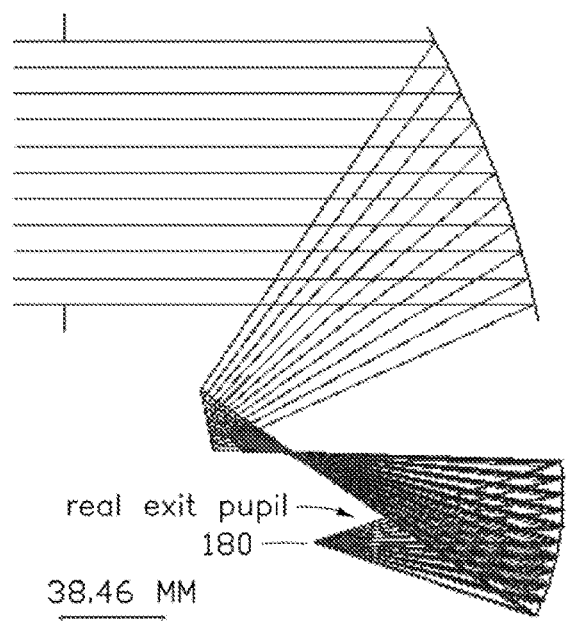
FIG. 8 shows a light path schematic view of one embodiment of a freeform surface off-axial three-mirror imaging system with a real exit pupil before optimization.
Figure 9:
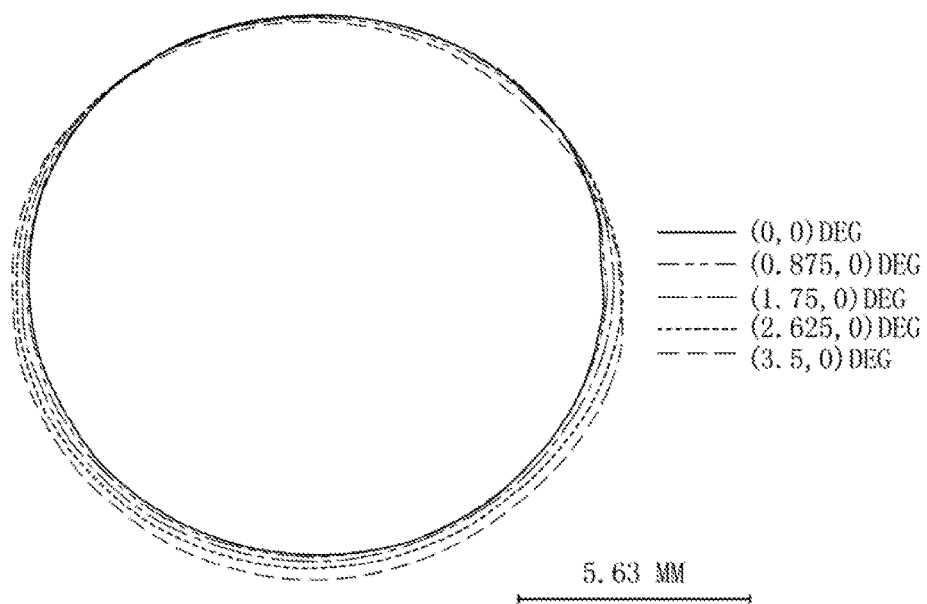
FIG. 9 shows light spots schematic view of different fields at exit pupil surface of one embodiment of the freeform surface off-axial three-mirror imaging system of FIG. 8.

Referring to FIG. 8, a light path schematic view of the before-optimization freeform surface off-axial three-mirror imaging system of step (S6') is shown. It is shown that the beams of each field can better focus on the imaging surface 180 and have a real exit pupil before the imaging surface 180. Furthermore, as shown in FIG. 9, the light footprints at exit pupil surfaces of different fields are almost the same. It is shown that there are a very small distortion of size and shape between the real exit pupil and the ideal exit pupil.

Figure 10:
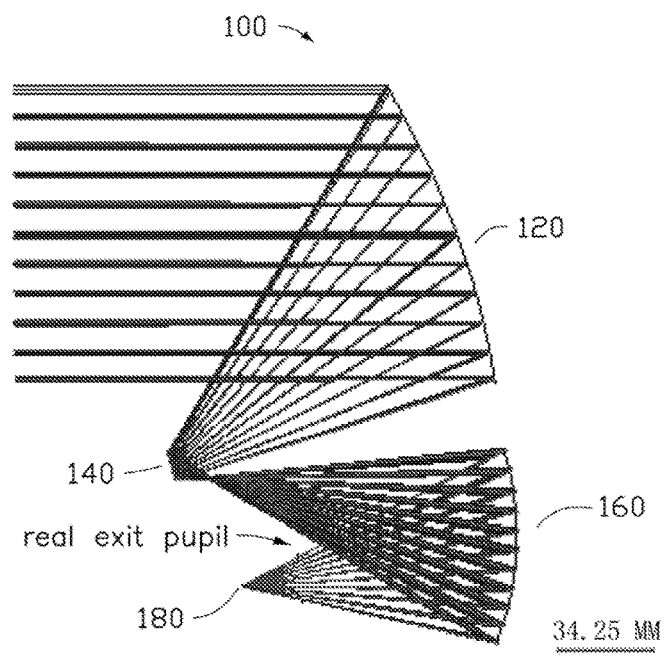
FIG. 10 shows a light path schematic view of one embodiment of a freeform surface off-axial three-mirror imaging system with a real exit pupil after optimization.

Referring to FIG. 10, a light path schematic view of the freeform surface off-axial three-mirror imaging system of step (S7') after optimizing the system of step (S6') is shown. It is shown that the beams of each field can much better focus on the imaging surface 180 to achieve an image with better quality and have a real exit pupil before the imaging surface 180.

Figure 11:
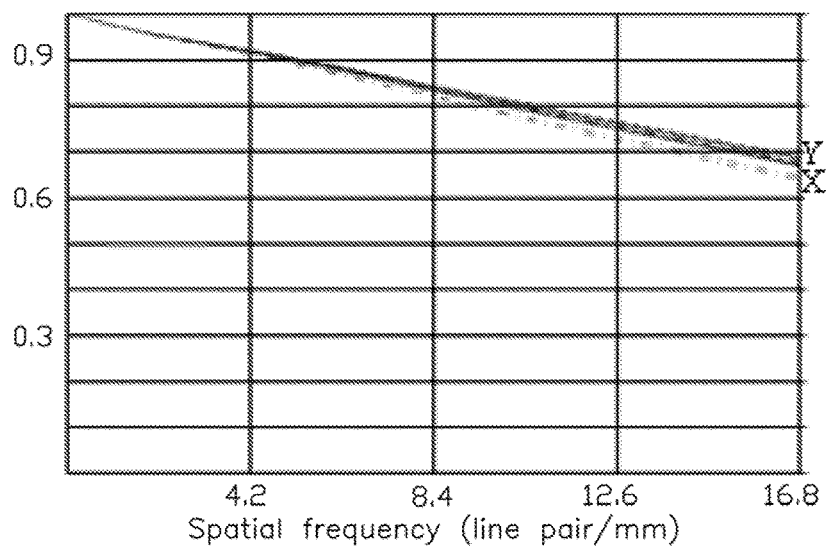
FIG. 11 shows a modulation transfer function (MTF) curve of one embodiment of a freeform surface off-axial three-mirror imaging system with a real exit pupil after optimization.

Referring to FIG. 11, a MTF curve under long wave infrared region of the freeform surface off-axial three-mirror imaging system of step (S7') after optimizing the system of step (S6') is shown. It is shown that the MTF curve of each field is closes to the diffraction limit, the imaging quality is further improved.

The method for designing the freeform surface off-axial imaging system with a real exit pupil can be implemented via computer software. Furthermore, a freeform surface off-axial imaging system with a real exit pupil can be made according to the designing.

The method for designing the freeform surface off-axial imaging system with a real exit pupil can have many advantages. First, the method considers both the coordinates and the normal vectors of the plurality of feature data points, therefore, the shape of the freeform surface off-axial imaging system with a real exit pupil designed by the method is accurate. And the method can also improve the optical properties of the freeform surface off-axial imaging system with a real exit pupil. Second, two three-dimensional rectangular coordinates systems are defined, after a sphere is obtained in the first three-dimensional rectangular coordinates system, the coordinates and the normal vector of the plurality of feature data points in the first three-dimensional rectangular coordinates system are transformed into the second three-dimensional rectangular coordinates system, then the freeform surface off-axial imaging system with a real exit pupil are obtained by surface fitting. The method is more precisely compared to conventional methods. Third, the freeform surface off-axial imaging system with a real exit pupil are designed by iteration steps, the plurality of actual intersections of the plurality of feature rays with the target surface are close to the ideal target points, therefore, the image quality of the freeform surface off-axial imaging system with a real exit pupil is high, and distortion of the real exit pupil is reduced.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for designing three-dimensional freeform surface of an off-axial optical system comprising:

step (S1), establishing a first initial system, wherein the first initial system comprises a plurality of first initial surfaces;

step (S2), a surface in front of and adjacent to the real exit pupil is defined as a surface M, selecting a plurality of feature rays $R_i$ (i=1, 2 . . . K), and calculating a plurality of intersections of the plurality of feature rays $R_i$ (i=1, 2 . . . K) with the surface M;

step (S3), calculating a Nth plurality of intersections of the plurality of feature rays $R_i$ (i=1, 2 . . . K) with a before-iteration Nth freeform surface in front of the surface M point by point based on a given light mapping relationship and a vector form of Snell's law, wherein N=1, and the Nth plurality of intersections are a Nth plurality of feature data points $P_i$ (i=1, 2 . . . K) of the before-iteration Nth freeform surface in front of the surface M; obtaining a Nth equation of the before-iteration Nth freeform surface by surface fitting the Nth plurality of feature data points $P_i$ (i=1, 2 . . . K), wherein the Nth equation of the before-iteration Nth freeform surface comprises a Nth base conic term and a Nth freeform surface term; wherein the surface fitting the Nth plurality of feature data points $P_i$ (i=1, 2 . . . K) comprises:

step (31): surface fitting the Nth plurality of feature data points $P_i$ (i=1, 2 . . . K) to a sphere in a first three-dimensional rectangular coordinates system, and obtaining a curvature c of the sphere and a center of curvature $(x_c, y_c, z_c)$ corresponding to the curvature c of the sphere;

step (S32): defining a feature data point $(x_o, y_o, z_o)$ corresponding to a chief ray of a central field angle among entire field-of-view as a vertex of the sphere, defining a second three-dimensional rectangular coordinates system by the vertex of the sphere as origin and a line passing through the center of curvature and the vertex of the sphere as a Z'-axis;

step (S33): transforming a first coordinates $(x_i, y_i, z_i)$ and a first normal vectors $(\alpha_i, \beta_i, \gamma_i)$, of the Nth plurality of feature data points $P_i$ (i=1, 2 . . . K) in the first three-dimensional rectangular coordinates system, into a second coordinates $(x'_i, y'_i, z'_i)$ and a second normal vectors $(\alpha'_i, \beta'_i, \gamma'_i)$, of the Nth plurality of feature data points $P_i$ (i=1, 2 . . . K) in the second three-dimensional rectangular coordinates system;

step (S34): fitting the Nth plurality of feature data points $P_i$ (i=1, 2 . . . K) into a conic surface equation of a conic surface in the second three-dimensional rectangular coordinates system, based on the second coordinates $(x'_i, y'_i, z'_i)$ and the curvature c of the sphere, and obtaining a conic constant k; and step (S35): removing a plurality of third coordinates and a plurality of third normal vectors of the Nth plurality of feature data points $P_i$ (i=1, 2 . . . K), on the conic surface in the second three-dimensional rectangular coordinates system, from the second coordinates $(x'_i, y'_i, z'_i)$ and the second normal vectors $(\alpha'_i, \beta'_i, \gamma'_i)$, to obtain a plurality of residual coordinates $(x''_i, y''_i, z''_i)$ (i=1, 2, . . . , K) and a plurality of residual normal vectors $N_i=(\alpha''_i, \beta''_i, -1)$ (i=1, 2, . . . , K); and surface fitting the plurality of residual coordinates $(x''_i, y''_i, z''_i)$ (i=1, 2, . . . , K) and the plurality of residual normal vectors $N_i=(\alpha''_i, \beta''_i, -1)$ (i=1, 2, . . . , K) to obtain a polynomial surface equation; the Nth equation of the before-iteration Nth freeform surface are obtained by adding the conic surface equation and the polynomial surface equation; wherein in the second three-dimensional rectangular coordinates system, the plurality of third coordinates and the plurality of third normal vectors of the Nth plurality of feature data points $P_i$ (i=1, 2 . . . K) on the conic surface are defined as $(x'_{is}, y'_{is}, z'_{is})$ and $(\alpha'_{is}, \beta'_{is}, \gamma'_{is})$ respectively, a Z'-axis component of the plurality of residual normal vectors are normalized to −1, the plurality of residual coordinates $(x''_i, y''_i, z''_i)$ (i=1, 2, . . . , K) satisfy $(x_i'', y_i'', z_i'')=(x_i', y_i', z_i'-z_{is}')$, and the plurality of residual normal vectors $N_i=(\alpha''_i, \beta''_i, -1)$ (i=1, 2, . . . , K) satisfy $$(\alpha_i'', \beta_i'', -1) = \left(\frac{\alpha_i'}{\gamma_i'} + \frac{\alpha_{is}'}{\gamma_{is}'}, \frac{\beta_i'}{\gamma_i'} + \frac{\beta_{is}'}{\gamma_{is}'}, -1\right);$$

step (S4), selecting N as N=N+1, and obtaining all before-iteration freeform surfaces by repeating step (S3) to step (S4);

step (S5), taking the before-iteration freeform surfaces as a plurality of second initial surfaces, and obtaining all after-iteration freeform surfaces with improved imaging quality in front of the surface M by multiple iterations;

step (S6), calculating a plurality of first intersections of the plurality of feature rays $R_i$ (i=1, 2 . . . K) with the surface M point by point based on a given object-image relationship and the vector form of Snell's law, wherein the plurality of first intersections are a plurality of first feature data points of the surface M; obtaining a before-iteration surface M by surface fitting the plurality of first feature data points; and taking the before-iteration surface M as a third initial surface, and obtaining an after-iteration surface M by multiple iterations; and step (S7), taking the after-iteration surface M obtained in step (S6) as a fourth initial surface, keeping some of the plurality of first initial surfaces that does not corresponds to the after-iteration surface M unchanged; and repeating steps (S2)-(S6) until match two conditions: condition (1), after being redirected by the after-iteration freeform surfaces in front of the surface M, a plurality of first actual intersections of the plurality of feature rays $R_i$ (i=1, 2 . . . K) with the after-iteration surface M are substantially close to the plurality of intersections; and condition (2), after being redirected by all the after-iteration freeform surfaces in front of the surface M and the after-iteration surface M, a plurality of second actual intersections of the plurality of feature rays $R_i$ (i=1, 2 . . . K) with an imaging surface are substantially close to a plurality of image points.

2. The method of claim 1, wherein the Nth plurality of feature data points $P_i$ (i=1, 2 . . . K) are obtained by:

step (a): defining a first intersection of a first feature ray $R_1$ and one of the plurality of first initial surfaces that corresponds to the before-iteration Nth freeform surface as a feature data point $P_1$;

step (b): when i ($1 \le i \le K-1$) feature data points $P_i$ ($1 \le i \le K-1$) have been obtained, a unit normal vector $\vec{N}_i$ ($1 \le i \le K-1$) at each of the i ($1 \le i \le K-1$) feature data points $P_i$ ($1 \le i \le K-1$) is calculated based on the vector form of Snell's Law;

step (c): making a first tangent plane at the i ($1 \le i \le K-1$) feature data points $P_i$ ($1 \le i \le K-1$) respectively; thus i first tangent planes are obtained, and i×(K−i) second intersections are obtained by the i first tangent planes intersecting with other (K−i) feature rays; and a second intersection, which is nearest to the i ($1 \le i \le K-1$) feature data points $P_i$, is fixed from the i×(K−i) second intersections as a next feature data point $P_{i+1}$ ($1 \le i \le K-1$); and step (d): repeating steps (b) and (c), until all the Nth plurality of feature data points $P_i$ (i=1, 2 . . . K) are calculated.

3. The method of claim 1, wherein the Nth plurality of feature data points $P_i$ (i=1, 2 . . . K) are obtained by:

step (a'): defining a first intersection of a first feature light ray $R_1$ and one of the plurality of first initial surfaces that corresponds to the before-iteration Nth freeform surface as a feature data point $P_1$;

step (b'): when an ith ($1 \le i \le K-1$) feature data point $P_i$ ($1 \le i \le K-1$) has been obtained, a unit normal vector $\vec{N}_i$ at the ith ($1 \le i \le K-1$) feature data point $P_i$ ($1 \le i \le K-1$) are calculated based on the vector form of Snell's law;

step (c'): making a first tangent plane through the ith ($1 \le i \le K-1$) feature data point $P_i$ ($1 \le i \le K-1$), and (K−i) second intersections are obtained by the first tangent plane intersecting with other (K−i) feature rays; a second intersection $Q_{i+1}$, which is nearest to the ith ($1 \le i \le K-1$) feature data point $P_i$ ($1 \le i \le K-1$), is fixed; and one of the plurality of feature rays $R_i$ (i=1, 2 . . . K) corresponding to the second intersection $Q_{i+1}$ is defined as $R_{i+1}$, a shortest distance between the second intersection $Q_{i+1}$ and an ith feature data point $P_i$ ($1 \le i \le K-1$) is defined as di;

step (d'): making a second tangent plane at (i−1) first feature data points that are obtained before the ith feature data point $P_i$ ($1 \le i \le K-1$) respectively; thus, (i−1) second tangent planes are obtained, and (i−1) third intersections are obtained by the (i−1) second tangent planes intersecting with a feature ray $R_{i+1}$; in each of the (i−1) second tangent planes, each of the (i−1) third intersections and some of the plurality of feature data points $P_i$ (i=1, 2 . . . K) that corresponds to the (i−1) third intersections form an intersection pair; the intersection pair, which has the shortest distance between one of the (i−1) third intersections and one of the plurality of feature data points $P_i$ (i=1, 2 . . . K) that corresponds to the one of the (i−1) third intersections, is fixed; and the one of the (i−1) third intersections and the shortest distance is defined as $Q'_{i+1}$ and $d'_i$ respectively;

step (e'): comparing $d_i$ and d'i, if $d_i \le d'_i$, $Q_{i+1}$ is taken as a next feature data point $P_{i+1}$ ($1 \le i \le K-1$); otherwise, $Q'_{i+1}$ is taken as the next feature data point $P_{i+1}$ ($1 \le i \le K-1$); and step (f'): repeating steps from (b') to (e'), until all the Nth plurality of feature data points $P_i$ (i=1, 2 . . . K) are calculated.

4. The method of claim 1, wherein a relationship between the second coordinates ($x'_i$, $y'_i$, $z'_i$) and the first coordinates ($x_i$, $y_i$, $z_i$) satisfies the following equation:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases};$$

wherein θ is a tilt angle of the sphere, in a Y'O'Z' plane of the second three-dimensional rectangular coordinates system relative to in a YOZ plane of the first three-dimensional rectangular coordinates system.

5. The method of claim 1, wherein a relationship between the second normal vectors ($\alpha'_i$, $\beta'_i$, $\gamma'_i$) and the first normal vectors ($\alpha_i$, $\beta_i$, $\gamma_i$) satisfies the following equation:

$$\begin{cases} \alpha'_i = \alpha_i \\ \beta'_i = \beta_i \cos\theta - \gamma_i \sin\theta \\ \gamma'_i = \beta_i \sin\theta + \gamma_i \cos\theta \end{cases},$$

wherein θ is a tilt angle of the sphere, in a Y'O'Z' plane of the second three-dimensional rectangular coordinates system relative to in a YOZ plane of the first three-dimensional rectangular coordinates system.

6. The method of claim 1, wherein a method of surface fitting the plurality of residual coordinates ($x''_i$, $y''_i$, $z''_i$) (i=1, 2, . . . , K) and the plurality of residual normal vectors $N_i = (\alpha''_i, \beta''_i, -1)$ (i=1, 2, . . . , K) comprises:

step (S351), expressing a polynomial surface by the polynomial surface equation, wherein the polynomial surface is expressed in terms of the following equation:

$$z = f(x, y; P) = \sum_{j=1}^{J} P_j g_j(x, y),$$

wherein $g_j(x,y)$ is one item of a polynomial, and $P=(p_1, p_2, \ldots, p_J)^T$ is coefficient sets;

step (S352), acquiring a first sum of squares $d1(P)$, of residual coordinate differences in z direction between the plurality of residual coordinates $(x''_i, y''_i, z''_i)$ (i=1, 2, ..., K) and the before-iteration Nth freeform surface; and a second sum of squares $d2(P)$, of modulus of vector differences between the plurality of residual normal vectors $N_i=(\alpha''_i, 3''_i, -1)$ (i=1, 2, ..., K) and a third normal vector of the before-iteration Nth freeform surface, wherein the first sum of squares $d1(P)$ is expressed in terms of a fourth equation:

$$d_1(P) = \sum_{i=1}^{I} [z_i - f(x''_i, y''_i; P)]^2 = (Z - A_1 P)^T (Z - A_1 P),$$

and the second sum of squares $d2(P)$ is expressed in terms of a fifth equation:

$$d_2(P) = \sum_{i=1}^{I} \{[u_i - f_{x''}(x''_i, y''_i; P)]^2 + [v_i - f_{y''}(x''_i, y''_i; P)]^2\} =$$

$$(U - A_2 P)^T (U - A_2 P) + (V - A_3 P)^T (V - A_3 P)$$

wherein, $Z = (z_1, z_2, L, z_I)^T$, $U = (u_1, u_2, L, u_I)^T$, $V = (v_1, v_2, L, v_I)^T$, $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g_1^x(x''_1, y''_1) & g_2^x(x''_1, y''_1) & \cdots & g_J^x(x''_1, y''_1) \\ g_1^x(x''_2, y''_2) & g_2^x(x''_2, y''_2) & \cdots & g_J^x(x''_2, y''_2) \\ \vdots & \vdots & & \vdots \\ g_1^x(x''_I, y''_I) & g_2^x(x''_I, y''_I) & \cdots & g_J^x(x''_I, y''_I) \end{pmatrix},$$

$$A_3 = \begin{pmatrix} g_1^y(x''_1, y''_1) & g_2^y(x''_1, y''_1) & \cdots & g_J^y(x''_1, y''_1) \\ g_1^y(x''_2, y''_2) & g_2^y(x''_2, y''_2) & \cdots & g_J^y(x''_2, y''_2) \\ \vdots & \vdots & & \vdots \\ g_1^y(x''_I, y''_I) & g_2^y(x''_I, y''_I) & \cdots & g_J^y(x''_I, y''_I) \end{pmatrix};$$

step (S353), obtaining an evaluation function, $$P = (A_1^T A_1 + w A_2^T A_2 + w A_3^T A_3)^{-1} \cdot (A_1^T Z + w A_2^T U + w A_3^T V),$$

wherein w is a weighting and greater than 0;

step (S354), selecting different weightings w and setting a gradient $\nabla f(P)$ of the evaluation function equal to 0, to obtain a plurality of different values of P and a plurality of freeform surface shapes $z=f(x, y; P)$ corresponding to each of the plurality of different values of P; and step (S355), choosing a final freeform surface shape $\Omega_{opt}$ which has a best imaging quality from the plurality of freeform surface shapes $z=f(x, y; P)$.

7. The method of claim 1, wherein the Nth equation of the before-iteration Nth freeform surface is:

$$z(x, y) = \frac{c(x^2 + y^2)}{1 + \sqrt{1 - (1+k)c^2(x^2 + y^2)}} + \sum_{j=1}^{N} A_j g_j(x, y);$$

wherein, $$\frac{c(x^2 + y^2)}{1 + \sqrt{1 - (1+k)c^2(x^2 + y^2)}}$$

is the Nth base conic term, c is the curvature of the conic surface at the vertex, k is the conic constant;

$$\sum_{j=1}^{N} A_j g_j(x, y)$$

is the Nth freeform surface term, $A_i$ represents an ith term coefficient.

8. The method of claim 1, wherein the multiple iterations comprises:

step (S51a): selecting N=1, a plurality of third actual intersections of the plurality of feature rays $R_i$ (i=1, 2 ... K) with the before-iteration Nth freeform surface are solved according to the Nth equation of the before-iteration Nth freeform surface and defined as a plurality of actual feature data points $P'_i$ (i=1, 2, ..., K), a unit normal vector at each of the plurality of actual feature data points $P'_i$ (i=1, 2, ..., K) is calculated, and the plurality of actual feature data points $P'_i$ (i=1, 2, ..., K) are surface fitted with the method in step (S3), to obtain an after-iteration Nth freeform surface;

step (S51b): selecting N as N=N+1;

step (S51c): repeating step (S51a) to step (S51b) to obtain all after-iteration freeform surfaces, thereby the multiple iterations are performed once; and step (S51d): all the after-iteration freeform surfaces obtained in step (S51c) is used as the plurality of second initial surfaces, and repeating step (S51a) to step (S51c), until the plurality of second actual intersections of the plurality of feature rays $R_i$ (i=1, 2 ... K) with the imaging surface are close to the target points.

9. The method of claim 1, wherein the plurality of intersections of the plurality of feature rays $R_i$ (i=1, 2 ... K) with the surface M are obtained using a reverse ray trace from the imaging surface to the surface M.

10. The method of claim 9, wherein the plurality of feature rays $R_i$ (i=1, 2 ... K) are radiated from the plurality of image points of a sample fields, and the plurality of first intersections of the plurality of feature rays $R_i$ (i=1, 2 ... K) with the surface M are used as the plurality of intersections of the plurality of feature rays $R_i$ (i=1, 2 ... K) with the surface M.

11. A method for designing three-dimensional freeform surface of an off-axial optical system comprising:

step (S1), establishing a first initial system, wherein the first initial system comprises a plurality of first initial surfaces;

step (S2), a surface in front of and adjacent to the real exit pupil is defined as a surface M, selecting a plurality of feature rays $R_i$ (i=1, 2 ... K), and calculating a plurality of intersections of the plurality of feature rays $R_i$ (i=1, 2 ... K) with the surface M;

step (S3), calculating a Nth plurality of intersections of the plurality of feature rays $R_i$ (i=1, 2 ... K) with a before-iteration Nth freeform surface in front of the surface M point by point based on a given light mapping relationship and a vector form of Snell's law, wherein N=1, and the Nth plurality of intersections are a Nth plurality of feature data points $P_i$ (i=1, 2 ... K) of the before-iteration Nth freeform surface in front of the surface M; obtaining a Nth equation of the before-iteration Nth freeform surface by surface fitting the Nth plurality of feature data points $P_i$ (i=1, 2 ... K), wherein the Nth equation of the before-iteration Nth freeform surface comprises a Nth base conic term and a Nth freeform surface term; wherein the surface fitting the Nth plurality of feature data points $P_i$ (i=1, 2 ... K) comprises:

step (31): surface fitting the Nth plurality of feature data points $P_i$ (i=1, 2 ... K) to a sphere in a first three-dimensional rectangular coordinates system, and obtaining a curvature c of the sphere and a center of curvature $(x_c, y_c, z_c)$ corresponding to the curvature c of the sphere;

step (S32): defining a feature data point $(x_o, y_o, z_o)$ corresponding to a chief ray of a central field angle among entire field-of-view as a vertex of the sphere, defining a second three-dimensional rectangular coordinates system by the vertex of the sphere as origin and a line passing through the center of curvature and the vertex of the sphere as a Z'-axis;

step (S33): transforming a first coordinates $(x_i, y_i, z_i)$ and a first normal vectors $(\alpha_i, \beta_i, \gamma_i)$, of the Nth plurality of feature data points $P_i$ (i=1, 2 ... K) in the first three-dimensional rectangular coordinates system, into a second coordinates $(x'_i, y'_i, z'_i)$ and a second normal vectors $(\alpha'_i, \beta'_i, \gamma'_i)$, of the Nth plurality of feature data points $P_i$ (i=1, 2 ... K) in the second three-dimensional rectangular coordinates system; wherein a relationship between the second coordinates $(x'_i, y'_i, z'_i)$ and the first coordinates $(x_i, y_i, z_i)$ satisfies the following equation:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases}$$

wherein θ is a tilt angle of the sphere, in a Y'O'Z' plane of the second three-dimensional rectangular coordinates system relative to in a YOZ plane of the first three-dimensional rectangular coordinates system;

step (S34): fitting the Nth plurality of feature data points $P_i$ (i=1, 2 ... K) into a conic surface equation of a conic surface in the second three-dimensional rectangular coordinates system, based on the second coordinates $(x'_i, y'_i, z'_i)$ and the curvature c of the sphere, and obtaining a conic constant k; and step (S35): removing a plurality of third coordinates and a plurality of third normal vectors of the Nth plurality of feature data points $P_i$ (i=1, 2 ... K), on the conic surface in the second three-dimensional rectangular coordinates system, from the second coordinates $(x'_i, y'_i, z'_i)$ and the second normal vectors $(\alpha'_i, \beta'_i, \gamma'_i)$, to obtain a plurality of residual coordinates $(x''_i, y''_i, z''_i)$ (i=1, 2, ..., K) and a plurality of residual normal vectors $N_i=(\alpha''_i, \beta''_i, -1)$ (i=1, 2, ..., K); and surface fitting the plurality of residual coordinates $(x''_i, y''_i, z''_i)$ (i=1, 2, ..., K) and the plurality of residual normal vectors $N_i=(\alpha''_i, \beta''_i, -1)$ (i=1, 2, ..., K) to obtain a polynomial surface equation; the Nth equation of the before-iteration Nth freeform surface are obtained by adding the conic surface equation and the polynomial surface equation;

step (S4), selecting N as N=N+1, and obtaining all before-iteration freeform surfaces by repeating step (S3) to step (S4);

step (S5), taking the before-iteration freeform surfaces as a plurality of second initial surfaces, and obtaining all after-iteration freeform surfaces with improved imaging quality in front of the surface M by multiple iterations;

step (S6), calculating a plurality of first intersections of the plurality of feature rays $R_i$ (i=1, 2 ... K) with the surface M point by point based on a given object-image relationship and the vector form of Snell's law, wherein the plurality of first intersections are a plurality of first feature data points of the surface M; obtaining a before-iteration surface M by surface fitting the plurality of first feature data points; and taking the before-iteration surface M as a third initial surface, and obtaining an after-iteration surface M by multiple iterations; and step (S7), taking the after-iteration surface M obtained in step (S6) as a fourth initial surface, keeping some of the plurality of first initial surfaces that does not corresponds to the after-iteration surface M unchanged; and repeating steps (S2)-(S6) until match two conditions: condition (1), after being redirected by the after-iteration freeform surfaces in front of the surface M, a plurality of first actual intersections of the plurality of feature rays $R_i$ (i=1, 2 ... K) with the after-iteration surface M are substantially close to the plurality of intersections; and condition (2), after being redirected by all the after-iteration freeform surfaces in front of the surface M and the after-iteration surface M, a plurality of second actual intersections of the plurality of feature rays $R_i$ (i=1, 2 ... K) with an imaging surface are substantially close to a plurality of image points.

12. A method for designing three-dimensional freeform surface of an off-axial optical system comprising:

step (S1), establishing a first initial system, wherein the first initial system comprises a plurality of first initial surfaces;

step (S2), a surface in front of and adjacent to the real exit pupil is defined as a surface M, selecting a plurality of feature rays $R_i$ (i=1, 2 ... K), and calculating a plurality of intersections of the plurality of feature rays $R_i$ (i=1, 2 ... K) with the surface M;

step (S3), calculating a Nth plurality of intersections of the plurality of feature rays $R_i$ (i=1, 2 ... K) with a before-iteration Nth freeform surface in front of the surface M point by point based on a given light mapping relationship and a vector form of Snell's law, wherein N=1, and the Nth plurality of intersections are a Nth plurality of feature data points $P_i$ (i=1, 2 ... K) of the before-iteration Nth freeform surface in front of the surface M; obtaining a Nth equation of the before-iteration Nth freeform surface by surface fitting the Nth plurality of feature data points $P_i$ (i=1, 2 ... K), wherein the Nth equation of the before-iteration Nth freeform surface comprises a Nth base conic term and a Nth freeform surface term; wherein the surface fitting the Nth plurality of feature data points $P_i$ (i=1, 2 ... K) comprises:

step (31): surface fitting the Nth plurality of feature data points $P_i$ (i=1, 2 ... K) to a sphere in a first three-dimensional rectangular coordinates system, and obtaining a curvature c of the sphere and a center of curvature $(x_c, y_c, z_c)$ corresponding to the curvature c of the sphere;

step (S32): defining a feature data point $(x_o, y_o, z_o)$ corresponding to a chief ray of a central field angle among entire field-of-view as a vertex of the sphere, defining a second three-dimensional rectangular coordinates system by the vertex of the sphere as origin and a line passing through the center of curvature and the vertex of the sphere as a Z'-axis;

step (S33): transforming a first coordinates $(x_i, y_i, z_i)$ and a first normal vectors $(\alpha_i, \beta_i, \gamma_i)$, of the Nth plurality of feature data points $P_i$ (i=1, 2 ... K) in the first three-dimensional rectangular coordinates system, into a second coordinates $(x'_i, y'_i, z'_i)$ and a second normal vectors $(\alpha'_i, \beta'_i, \gamma'_i)$, of the Nth plurality of feature data points $P_i$ (i=1, 2 ... K) in the second three-dimensional rectangular coordinates system; wherein a relationship between the second normal vectors $(\alpha'_i, \beta'_i, \gamma'_i)$ and the first normal vectors $(\alpha_i, \beta_i, \gamma_i)$ satisfies the following equation:

$$\begin{cases} \alpha'_i = \alpha_i \\ \beta'_i = \beta_i \cos\theta - \gamma_i \sin\theta \\ \gamma'_i = \beta_i \sin\theta + \gamma_i \cos\theta \end{cases}$$

wherein $\theta$ is a tilt angle of the sphere, in a Y'O'Z' plane of the second three-dimensional rectangular coordinates system relative to in a YOZ plane of the first three-dimensional rectangular coordinates system;

step (S34): fitting the Nth plurality of feature data points $P_i$ (i=1, 2 ... K) into a conic surface equation of a conic surface in the second three-dimensional rectangular coordinates system, based on the second coordinates $(x'_i, y'_i, z'_i)$ and the curvature c of the sphere, and obtaining a conic constant k; and step (S35): removing a plurality of third coordinates and a plurality of third normal vectors of the Nth plurality of feature data points $P_i$ (i=1, 2 ... K), on the conic surface in the second three-dimensional rectangular coordinates system, from the second coordinates $(x'_i, y'_i, z'_i)$ and the second normal vectors $(\alpha'_i, \beta'_i, \gamma'_i)$, to obtain a plurality of residual coordinates $(x''_i, y''_i, z''_i)$ (i=1, 2, ..., K) and a plurality of residual normal vectors $N_i=(\alpha''_i, \beta''_i, -1)$ (i=1, 2, ..., K); and surface fitting the plurality of residual coordinates $(x''_i, y''_i, z''_i)$ (i=1, 2, ..., K) and the plurality of residual normal vectors $N_i=(\alpha''_i, \beta''_i, -1)$ (i=1, 2, ..., K) to obtain a polynomial surface equation; the Nth equation of the before-iteration Nth freeform surface are obtained by adding the conic surface equation and the polynomial surface equation;

step (S4), selecting N as N=N+1, and obtaining all before-iteration freeform surfaces by repeating step (S3) to step (S4);

step (S5), taking the before-iteration freeform surfaces as a plurality of second initial surfaces, and obtaining all after-iteration freeform surfaces with improved imaging quality in front of the surface M by multiple iterations;

step (S6), calculating a plurality of first intersections of the plurality of feature rays $R_i$ (i=1, 2 ... K) with the surface M point by point based on a given object-image relationship and the vector form of Snell's law, wherein the plurality of first intersections are a plurality of first feature data points of the surface M; obtaining a before-iteration surface M by surface fitting the plurality of first feature data points; and taking the before-iteration surface M as a third initial surface, and obtaining an after-iteration surface M by multiple iterations; and step (S7), taking the after-iteration surface M obtained in step (S6) as a fourth initial surface, keeping some of the plurality of first initial surfaces that does not corresponds to the after-iteration surface M unchanged; and repeating steps (S2)-(S6) until match two conditions: condition (1), after being redirected by the after-iteration freeform surfaces in front of the surface M, a plurality of first actual intersections of the plurality of feature rays $R_i$ (i=1, 2 ... K) with the after-iteration surface M are substantially close to the plurality of intersections; and condition (2), after being redirected by all the after-iteration freeform surfaces in front of the surface M and the after-iteration surface M, a plurality of second actual intersections of the plurality of feature rays $R_i$ (i=1, 2 ... K) with an imaging surface are substantially close to a plurality of image points.

* * * * *